United States Patent
Katsura

(10) Patent No.: US 7,270,210 B2
(45) Date of Patent: Sep. 18, 2007

(54) BODY FRAME FOR MOTORCYCLE

(75) Inventor: Takehisa Katsura, Shizuoka-ken (JP)

(73) Assignee: Yamaha Hatsudoki Kabushi Kaisha, Shizuolka-Ken (JP)

( * ) Notice: Subject to any disclaimer, the term of this patent is extended or adjusted under 35 U.S.C. 154(b) by 0 days.

(21) Appl. No.: 10/810,351

(22) Filed: Mar. 26, 2004

(65) Prior Publication Data

US 2004/0206566 A1 Oct. 21, 2004

(30) Foreign Application Priority Data

Mar. 28, 2003 (JP) .............................. 2003-092438

(51) Int. Cl.
*B62D 61/02* (2006.01)
*B62K 11/02* (2006.01)
*B62M 7/02* (2006.01)

(52) U.S. Cl. ....................................... 180/219; 180/220

(58) Field of Classification Search ................. 180/219, 180/220

See application file for complete search history.

(56) References Cited

U.S. PATENT DOCUMENTS

| | | | |
|---|---|---|---|
| 4,852,678 A * | 8/1989 | Yamaguchi | 180/219 |
| 5,054,571 A * | 10/1991 | Takasaka | 180/219 |
| 5,353,888 A * | 10/1994 | Tsukahara | 180/219 |
| 6,290,015 B1 * | 9/2001 | Horii et al. | 180/219 |
| 6,481,522 B1 * | 11/2002 | Adachi | 180/219 |
| 6,679,347 B2 * | 1/2004 | Iimuro | 180/219 |

FOREIGN PATENT DOCUMENTS

| | | |
|---|---|---|
| JP | 55-123580 | 9/1980 |
| JP | 61-291281 | 12/1986 |
| JP | 62-26177 | 2/1987 |
| JP | 63-30292 | 2/1988 |
| JP | 01-106789 | 4/1989 |
| JP | 1-21919 | 6/1989 |
| JP | 1-112186 | 7/1989 |
| JP | 02-274679 | 11/1990 |
| JP | 05-039077 | 2/1993 |
| JP | 05-193544 | 8/1993 |
| JP | 6-3752 | 2/1994 |
| JP | 08-216960 | 8/1996 |
| JP | 09-175464 | 7/1997 |
| JP | 09-276451 | 10/1997 |
| JP | 2779821 | 5/1998 |
| JP | 11-129966 | 5/1999 |
| JP | 2001-010578 | 1/2001 |
| JP | 2001-071974 | 3/2001 |

* cited by examiner

*Primary Examiner*—Lesley D. Morris
*Assistant Examiner*—Marc A. Scharich
(74) *Attorney, Agent, or Firm*—Hogan & Hartson LLP

(57) ABSTRACT

A body frame for a motorcycle includes a main frame having a reinforcing member, which is a forged product, and a portion that requires a high strength against a shock load transmitted from a road surface. A pair of sidewalls and a connecting wall for connecting the sidewalls are also provided. The sidewalls create spaces opened outward in cross-section such that the connecting wall has an external face positioned in the portion that requires high strength.

18 Claims, 20 Drawing Sheets

BODY FRAME FOR MOTORCYCLE

BACKGROUND OF THE INVENTION

Field of the Invention

This invention relates to a body frame for a motorcycle, on which an engine is mounted, including a main frame for supporting a front fork and rear arms.

For example, a motocross motorcycle, from the viewpoint of its application, jumps down from high places to the road surface, which may cause a high shock load transmitted from the road surface to be applied to the body frame. This therefore requires the body frame to have high rigidity and strength against the shock load as well as to be lightweight.

A body frame to meet such requirements may have improved rigidity and strength while having a cast or forged head pipe and a gusset formed as a unit in the viewpoint of weight reduction. In another type of body frame, a rear arm bracket has separate members, an upper half portion, which is a hollow casting, and a lower half portion, which is a forging, to be connected to each other.

The conventional frame having the cast head pipe and gusset could establish a sufficient thickness for not only a certain part of the frame that requires high strength but also for the other part of the frame that does not require high strength. This may provide insufficient weight reduction effects of the frame.

In addition, the frame having the forged head pipe and gusset results in increased manufacturing costs compared with the frame using the cast members. The frame having the forged pipe and gussets further results in a problem of low flexibility in frame form and size.

Using the above conventional frame, in which the rear arm bracket has separate members, an upper half portion, which is a hollow cast, and a lower half portion, which is a forged, to be connected to each other, results in problems of increased number of components and costs. In the viewpoint of reducing the number of components and the costs, the lower half portion may extend upward to be formed integral with the upper half portion. In this case, however, there may arise a problem of insufficient strength against a load applied to the upper half portion, resulting in a necessity of additional reinforcing members. Therefore, no cost reduction occurs.

An advantage of the present invention made in view of the situations with the conventional frames described above is to provide a body frame for a motorcycle capable of ensuring rigidity and strength of the body frame while reducing the frame weight and the increased manufacturing cost, as well as being capable of improving flexibility in frame form and size.

SUMMARY OF THE INVENTION

A body frame for a motorcycle, on which an engine unit is mounted, includes a main frame for supporting a front fork and rear arms. The main frame has a reinforcing member, which is a forged product, provided in its portion that requires high strength against a shock load transmitted from a road surface and includes a pair of sidewalls and a connecting wall for connecting the sidewalls. The walls create spaces opened outward in cross-section such that the connecting wall has the external face positioned in the portion that requires high strength, which is, on the side where the highest stress occurs in cross-section.

The main frame includes a head pipe unit, which is made up of cast products, including a head pipe for supporting the front fork, and upper and lower gussets extending obliquely downward while widening to the rear of the vehicle from the head pipe. The reinforcing member is a down frame member including a lower head connected to the lower end of the head pipe and having a bearing seat and a down frame extending from the lower head along the lower edge of the lower gusset. The down frame covers the lower edge of the lower gusset from below and is the connecting wall with its external face facing downward and the sidewalls jointed to each lower edge of the lower gusset.

The main frame includes a head pipe unit, which is made up of cast products, including a head pipe for supporting the front fork, and upper and lower gussets extending obliquely downward while widening to the rear of the vehicle from the head pipe. The reinforcing member is a tank rail member including an upper head connected to the upper end of the head pipe and having a bearing seat and a tank rail extending from the upper head along the upper edge of the upper gusset. The tank rail covers the upper edge of the upper gusset from above and has the connecting wall with its external face facing upward and the sidewalls jointed to each upper edge of the upper gusset.

According to an embodiments of the present invention, the main frame includes a head pipe unit, which is made up of cast products, including a head pipe for supporting the front fork and upper and lower gussets extending obliquely downward while widening to the rear of the vehicle from the head pipe. The reinforcing member is a down frame member including a lower head connected to the lower end of the head pipe and having a bearing seat and a down frame extending from the lower head along the lower edge of the lower gusset. A tank rail member is provided that includes an upper head connected to the upper end of the head pipe and has a bearing seat and a tank rail extending from the upper head along the upper edge of the upper gusset. The down frame covers the lower edge of the lower gusset from below and has the connecting wall with its external face facing downward and the sidewalls jointed to each lower edge of the lower gusset. The tank rail member covers the upper edge of the upper gusset from above and has the connecting wall with its external face facing upward and the sidewalls jointed to each upper edge of the upper gusset.

The head pipe unit has an opening on the undersurface of the lower gusset. The down frame is so disposed to close the opening on the undersurface of the lower gusset and has the connecting wall with its external face facing downward and the sidewalls positioned at each edge of the opening on the undersurface. The edges of the sidewalls are welded to the lower gusset.

The head pipe unit has each opening on the top surface of the upper gusset and the undersurface of the lower gusset. The down frame is so disposed to close the opening on the undersurface of the lower gusset and has the connecting wall with its external face facing downward and the sidewalls positioned at each edge of the opening on the undersurface. The edges of the sidewalls are welded to the lower gusset and the tank rail is so disposed to close the opening on the top surface of the upper gusset and have the connecting wall with its external face facing upward and the sidewalls positioned at each edge of the opening on the top surface. The edges of the sidewalls are welded to the upper gusset.

A connecting portion is formed integrally with the head pipe unit to connect the rear portions of the upper and lower gussets to each other and a rear cushion bracket is formed integrally with the rear end of the upper gusset extending therefrom.

The main frame includes a head pipe for supporting the front fork, a tank rail extending obliquely downward from the top of the head pipe towards the rear of the vehicle, a down frame extending downward from the bottom of the head pipe and a pair of left and right down tubes extending towards the rear of the vehicle. The reinforcing member is a pair of left and right rear arm brackets interposed across the rear ends of the left and right down tubes with the rear end of the tank rail to connect them to each other and supporting the rear arms for up-down swinging. Each of the rear arm brackets is disposed such that a part of the connecting wall, which is adjacent to the connecting portion with the tank rail, has the external face facing the inner side in the vehicle's width direction.

Each of the left and right rear arm brackets includes a lower half portion approximately vertically extending upward from each rear end of the left and right down tubes positioned with an interval in the vehicle's width direction when viewed in the longitudinal direction of the vehicle. An upper half portion obliquely extends in the inner side in the vehicle's width direction from the lower half portion towards the rear end of the tank rail positioned in the center of the vehicle's width direction. The upper half portion has the connecting wall with its external face facing the inner side in the vehicle's width direction and the lower half portion having the connecting wall with its external face facing outward.

A connecting portion of the rear arm brackets to the tank rail is welded thereto such that the connecting wall has the external face facing the outer side in the vehicle's width direction. The connecting portion with the tank rail has a closed cross-section.

The lower ends of the left and right rear arm brackets are connected to each other via an angular cylindrical cross pipe made of an extrusion extending in the vehicle's width direction. A work hole is formed through a portion to receive a fastening bolt for change pedals on the cross pipe.

According to an embodiment of the present invention, the main frame includes a head pipe unit including a head pipe for supporting the front fork, and upper and lower gussets extending obliquely downward while widening to the rear of the vehicle from the head pipe. A pair of left and right down tubes are connected to the lower end of the lower gusset and extending downward towards the rear of the vehicle. The reinforcing member is a down frame member including a lower head connected to the lower end of the head pipe and having a bearing seat and a down frame extending from the lower head along the lower edge of the lower gusset. A tank rail member includes the upper head connected to the upper end of the head pipe and a tank rail extending from the upper head along the upper edge of the upper gusset. Left and rear arm brackets are interposed across the rear ends of the left and right down tubes and the rear end of the upper gusset to connect them to each other. The down frame covers the lower edge of the lower gusset from below and has the connecting wall with its external face facing downward and the sidewalls jointed to each lower edge of the lower gusset and the tank rail. The tank rail member covers the upper edge of the upper gusset from above and has the connecting wall with its external face facing upward and the sidewalls jointed to each upper edge of the upper gusset. Each of the rear arm brackets is disposed such that a part of the connecting wall, which is adjacent to the connecting portion with the tank rail, has the external face facing the inner side in the vehicles width direction.

The down frame has, at its lower end, a receiving portion provided with a mounting opening facing forward of the vehicle. Each of the left and right rear arm brackets has, at its lower end, a receiving portion provided with a mounting opening facing forward. Each of the left and right down tubes has its rear end attached to the receiving portion of the rear arm bracket from the front of the vehicle, and its front end attached to the receiving portion of the down frame from the front of the vehicle. The ends are welded to the respective receiving portions.

DETAILED DESCRIPTION OF THE PREFERRED EMBODIMENTS

The embodiments of the present invention will be hereinafter described in reference to the appended drawings.

Figure 1:
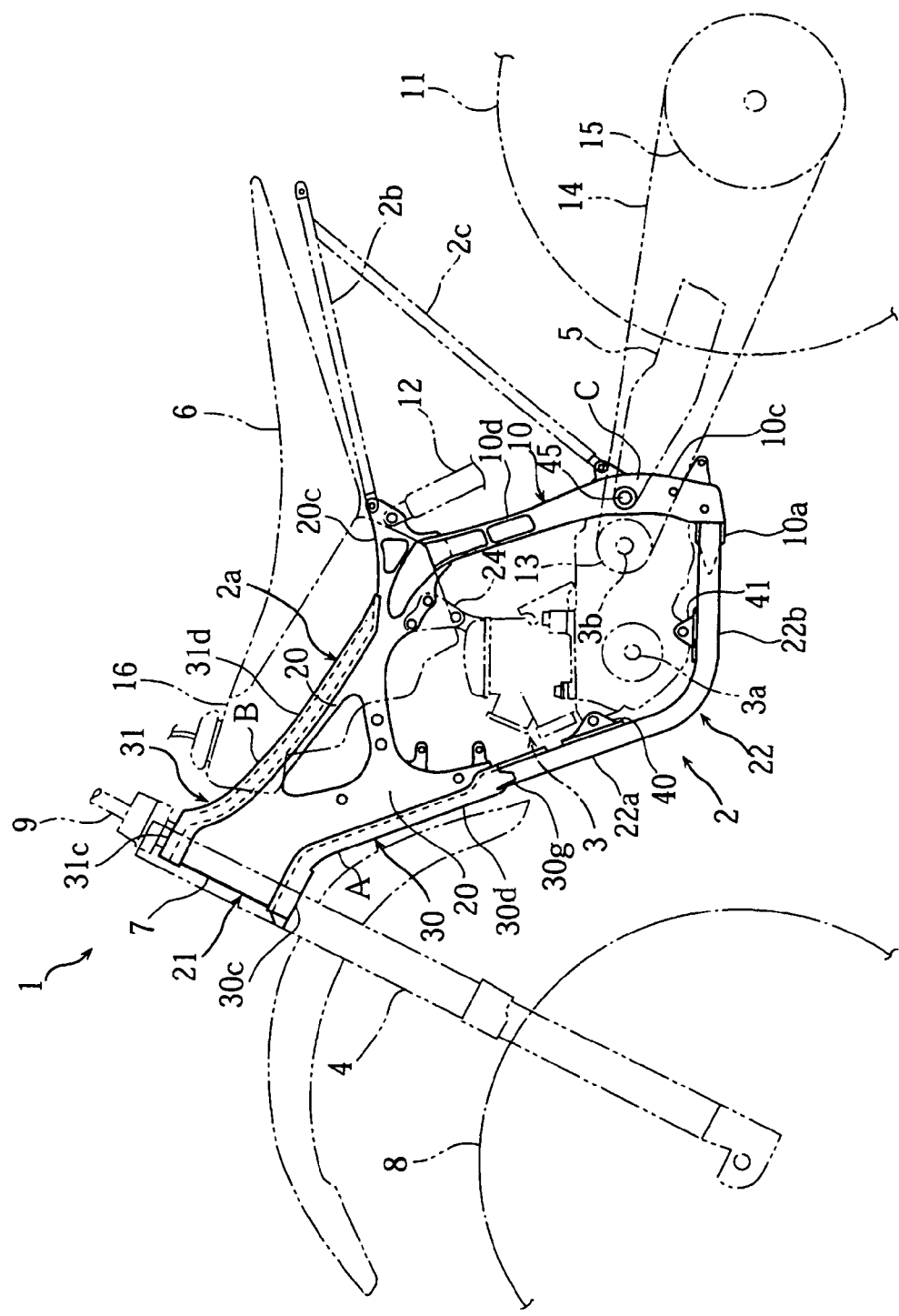
FIG. 1 is a side view of a motorcycle on which a body frame as a first embodiment of the present invention is mounted.
Figure 2:
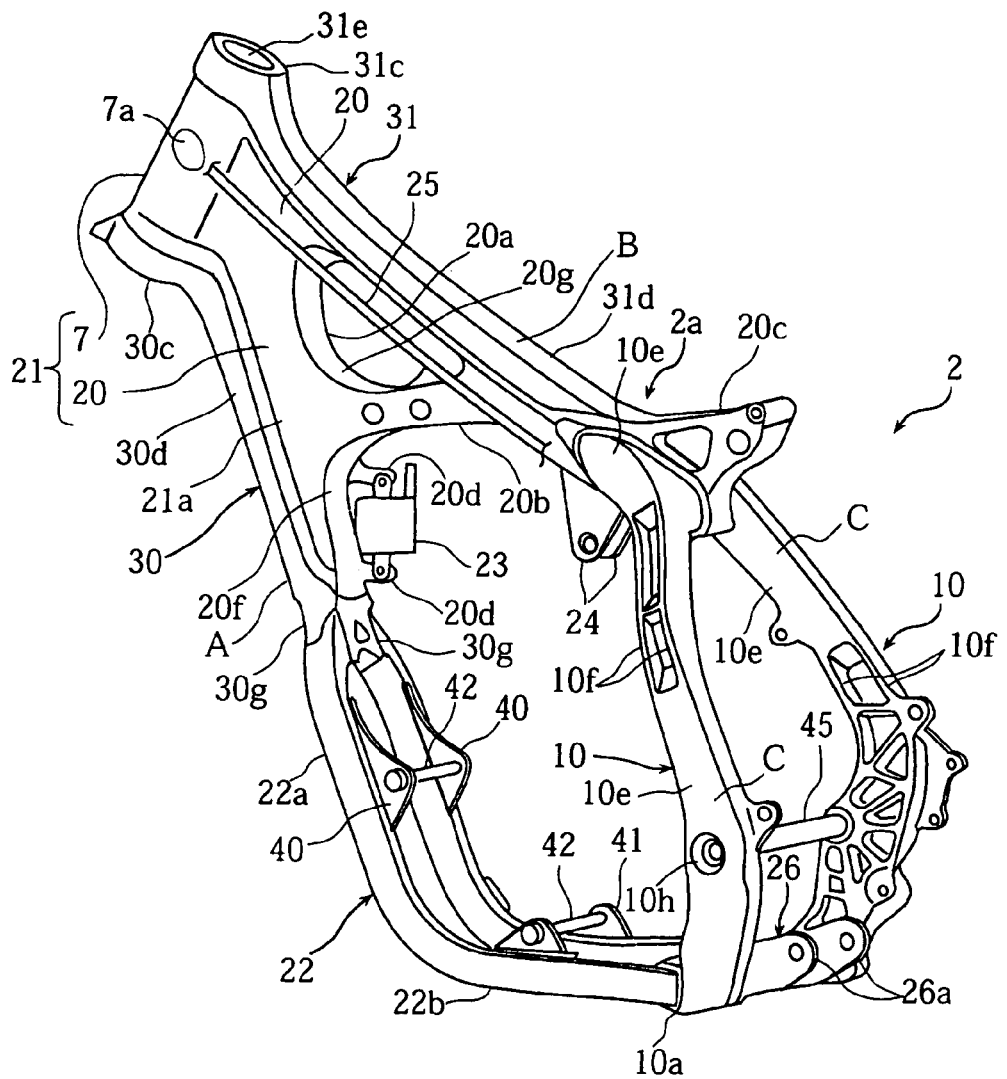
FIG. 2 is a perspective view of a main frame of the body frame.
Figure 3:
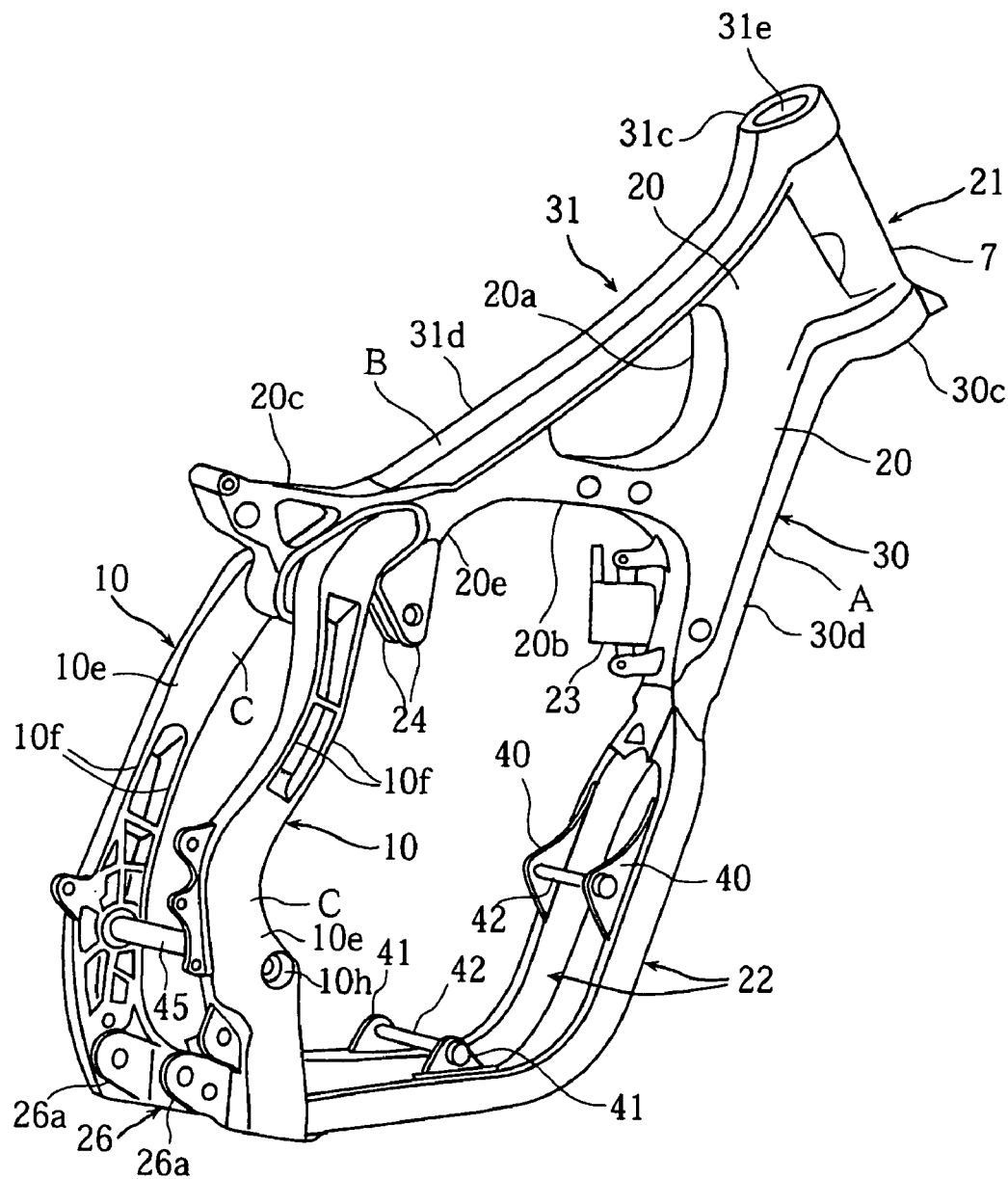
FIG. 3 is a perspective view of the main frame.
Figure 4:
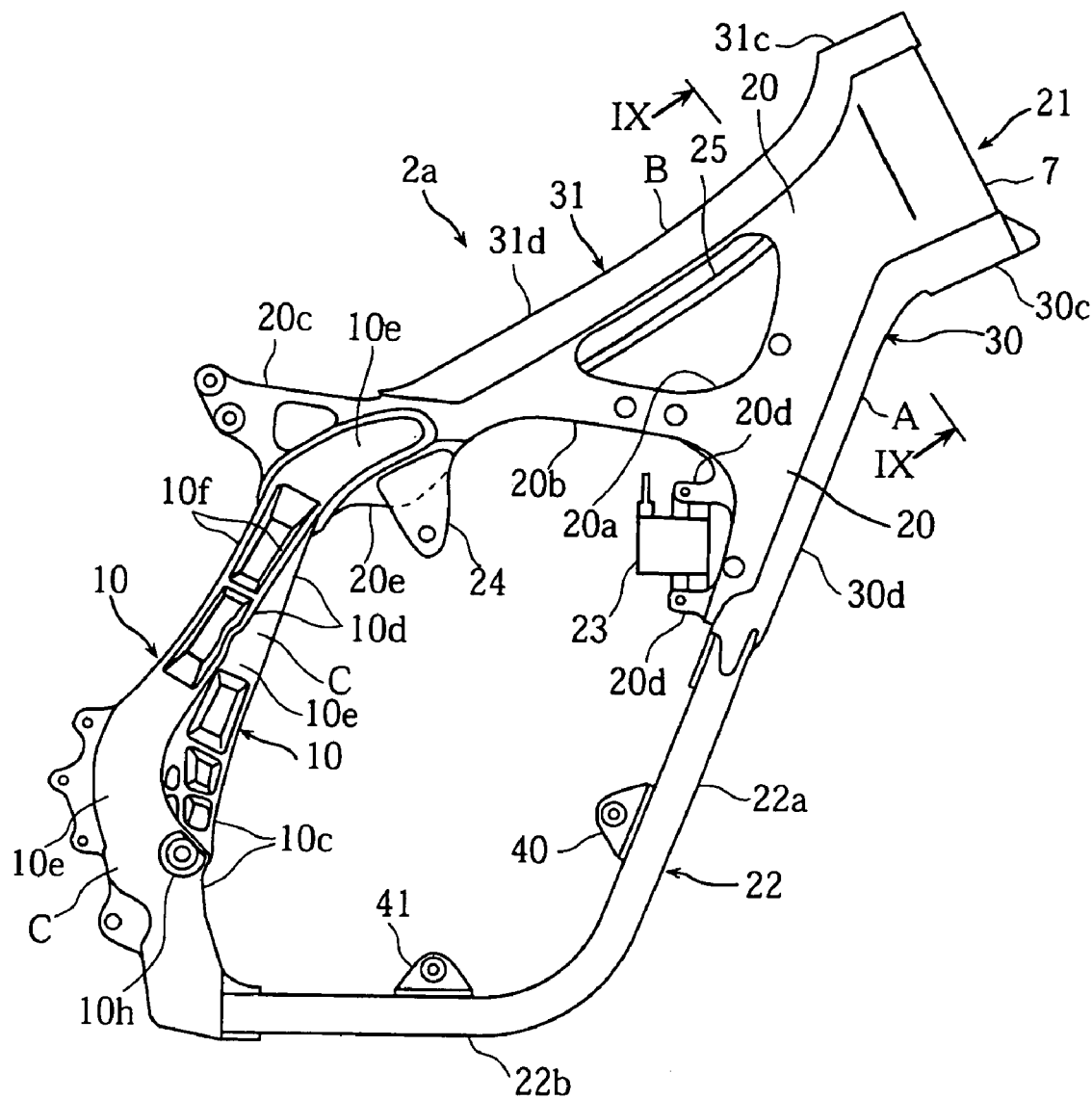
FIG. 4 is a side view of the main frame.
Figure 5:
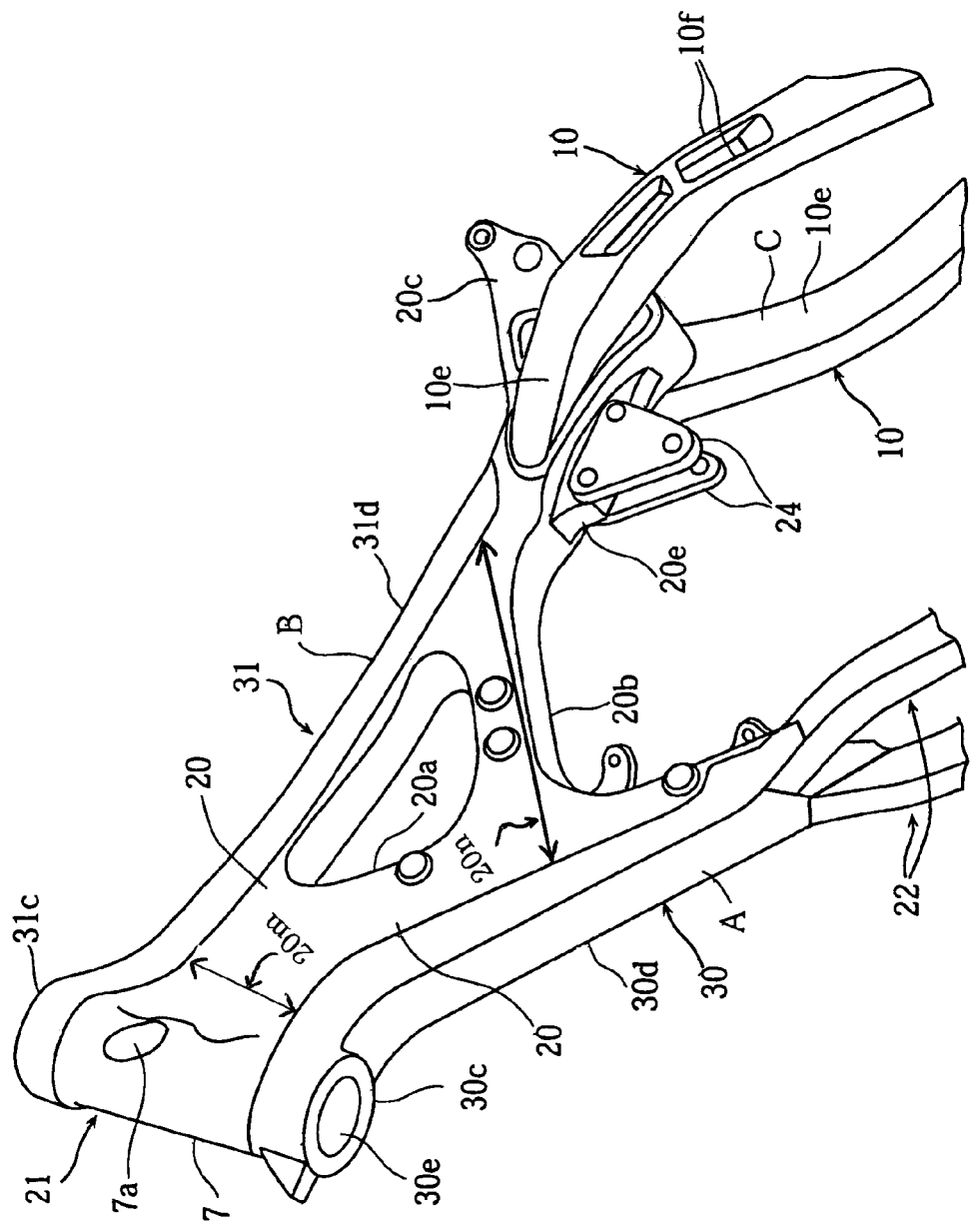
FIG. 5 is a perspective view of a head pipe unit of the main frame.
Figure 6:
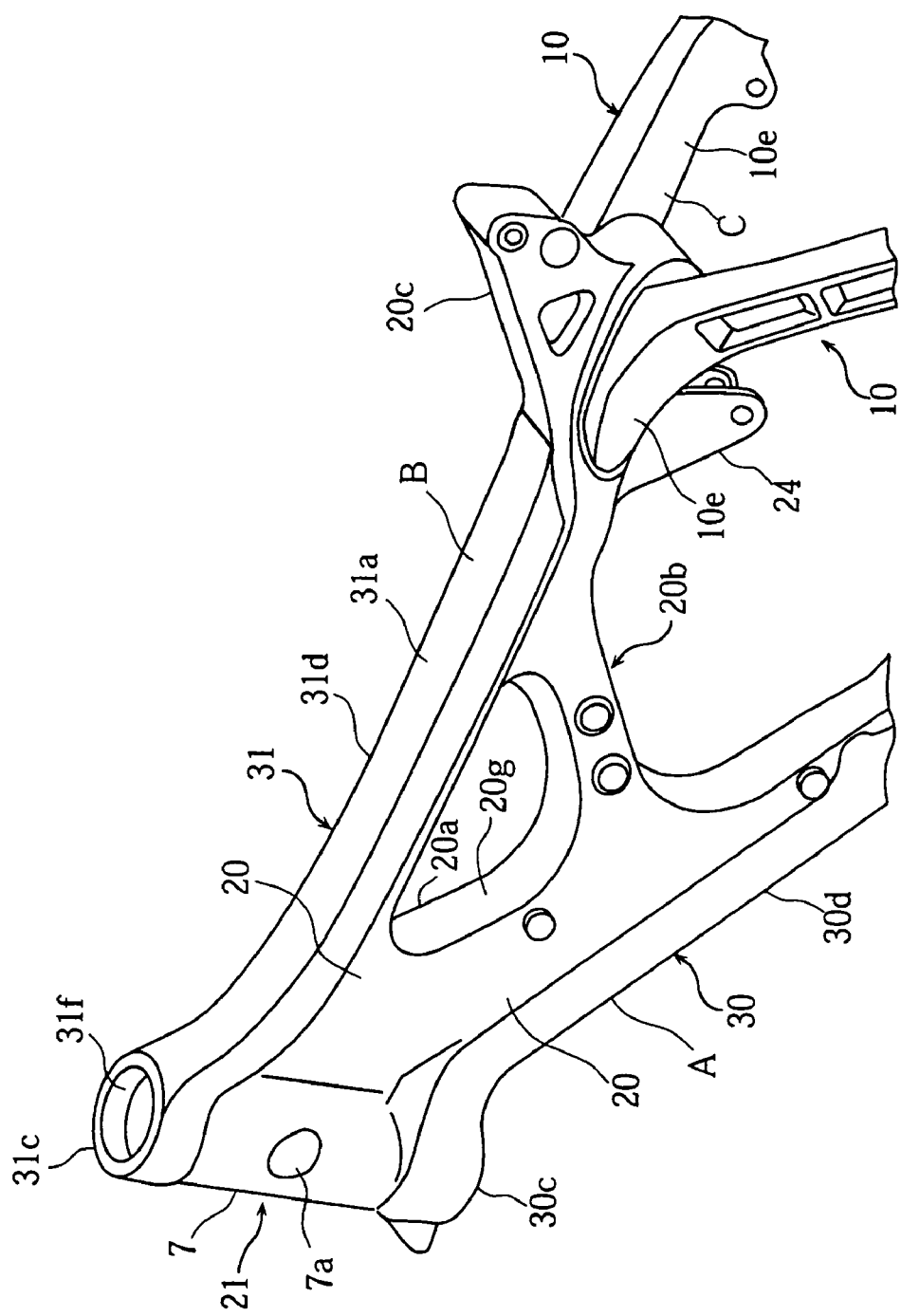
FIG. 6 is a perspective view of the head pipe unit.
Figure 7:
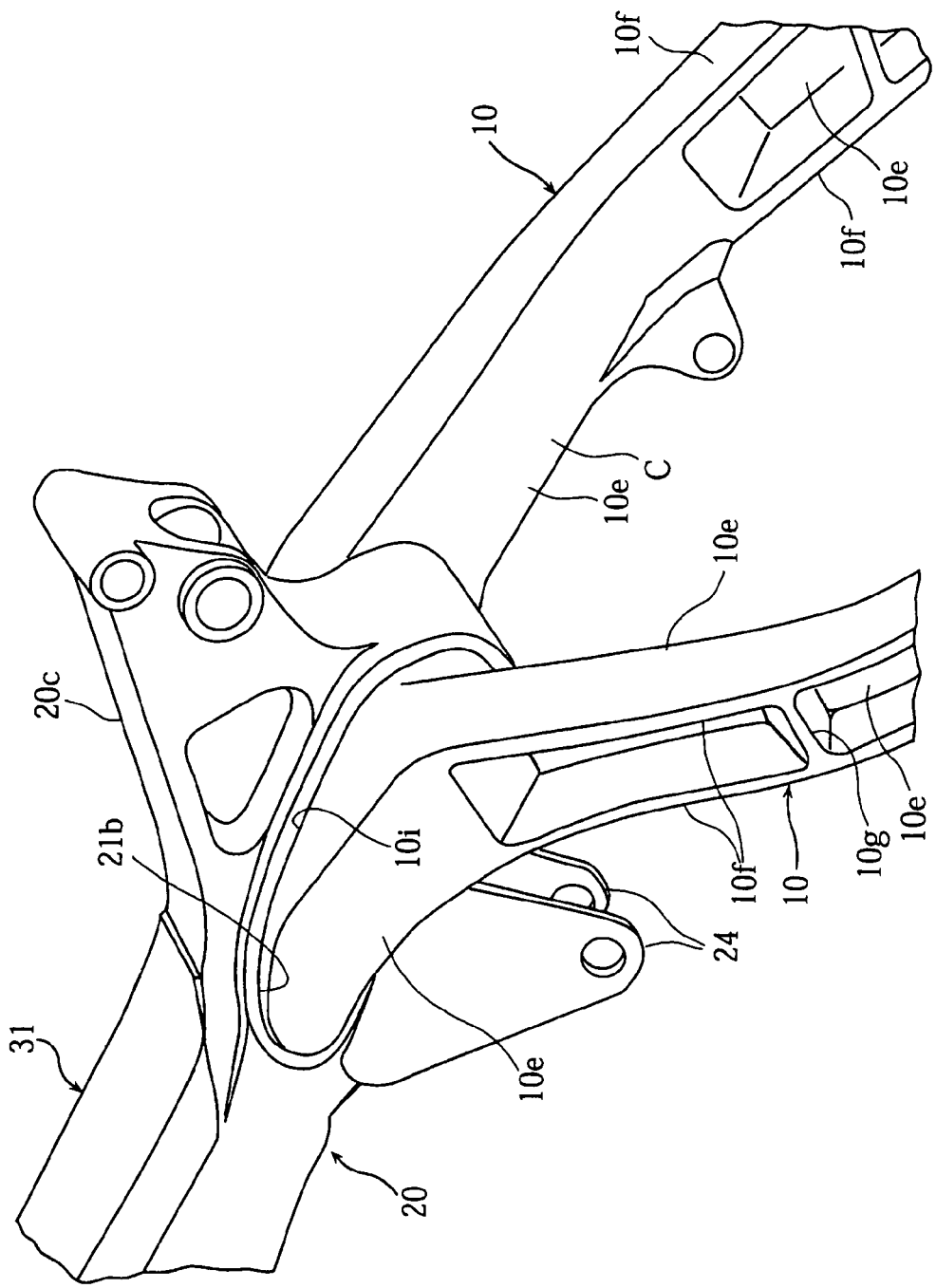
FIG. 7 is a perspective view of a joint of a rear arm bracket of the main frame.
Figure 8:
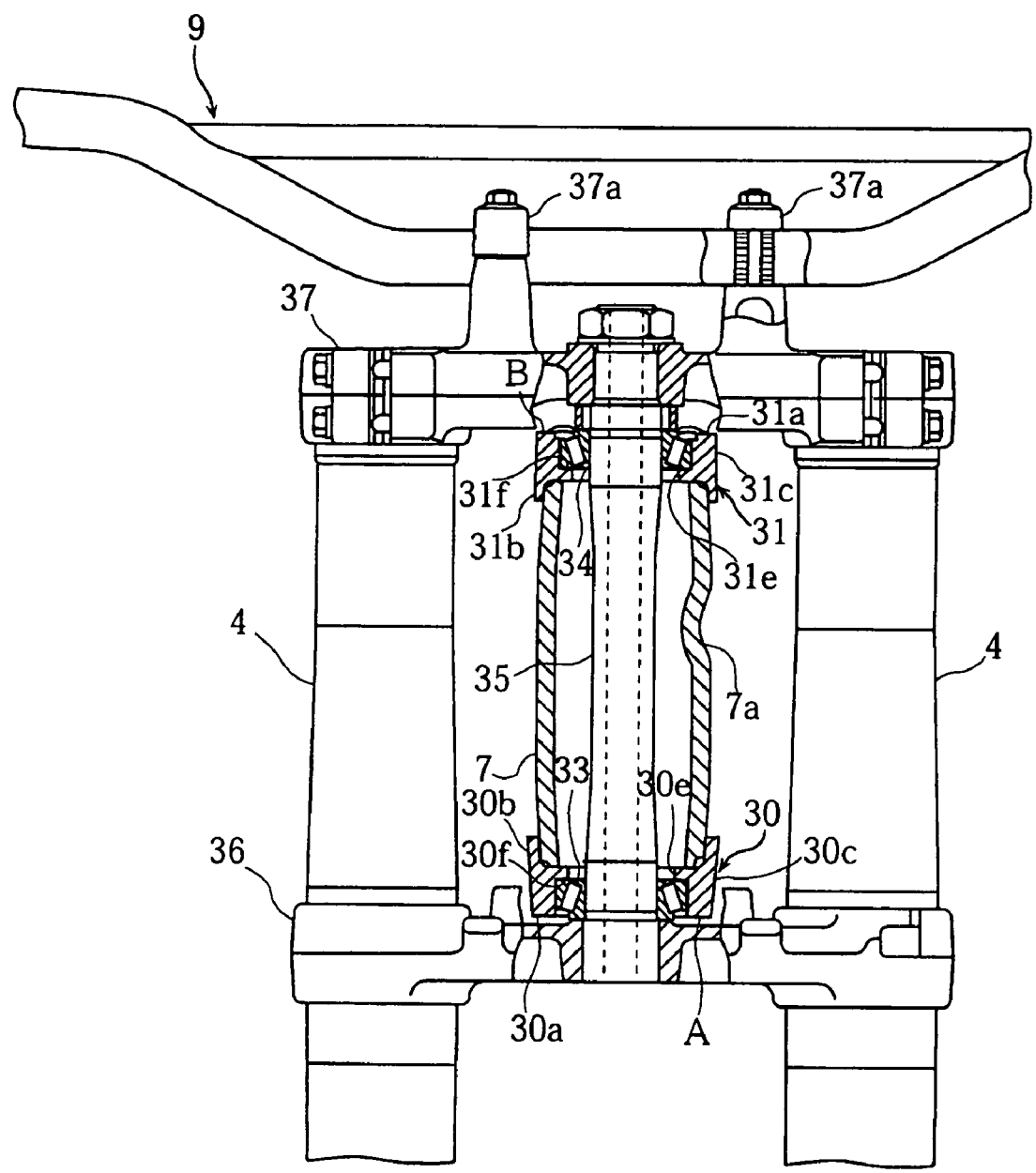
FIG. 8 is a sectional front view of a head pipe of the head pipe unit.
Figure 9:
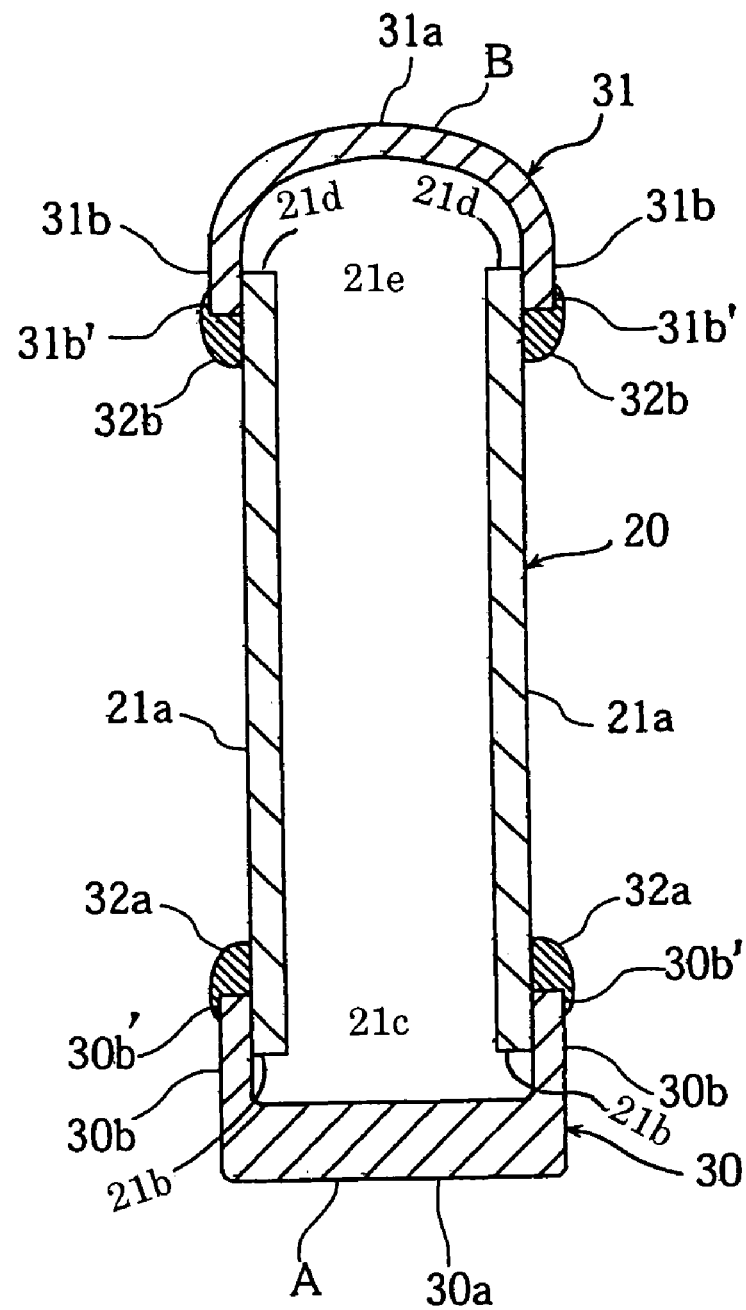
FIG. 9 is a sectional view of the head pipe unit taken along the line IX-IX in FIG. 4.
Figure 10:
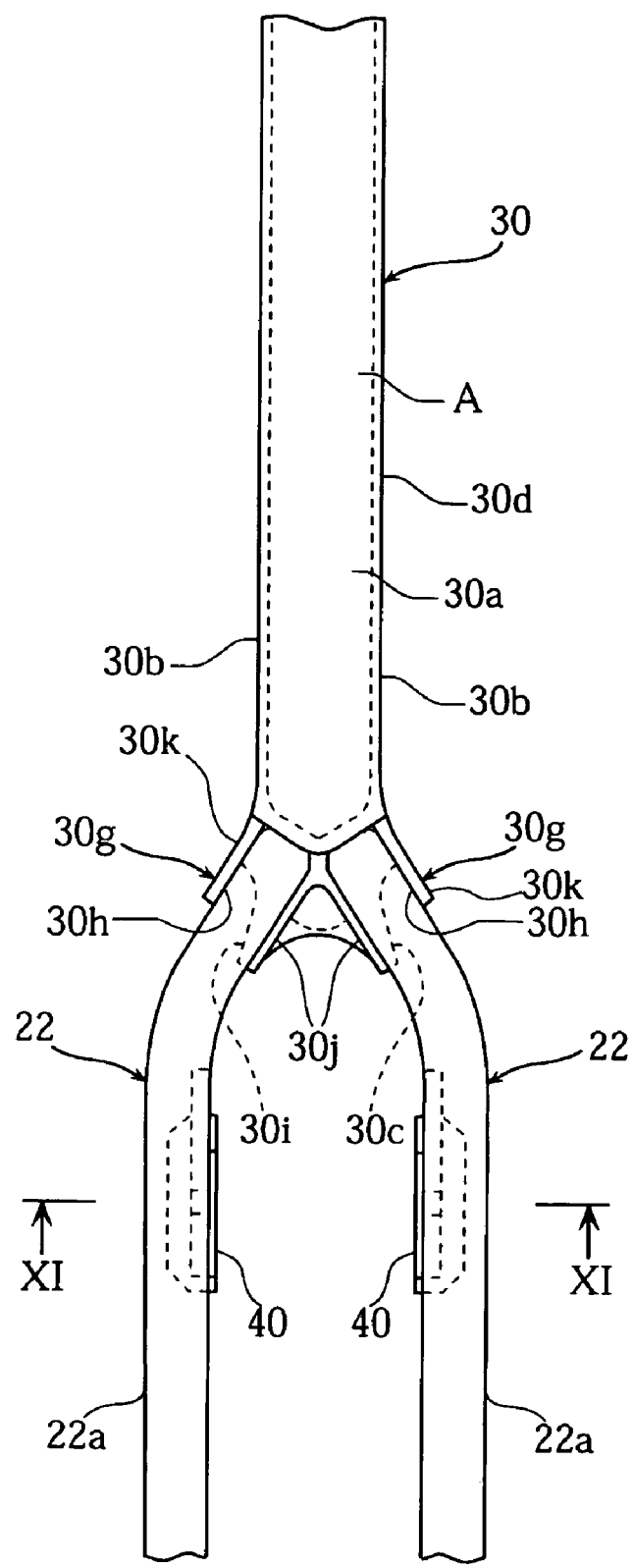
FIG. 10 is a front view of a connecting portion of a down tube of the head pipe unit.
Figure 11:
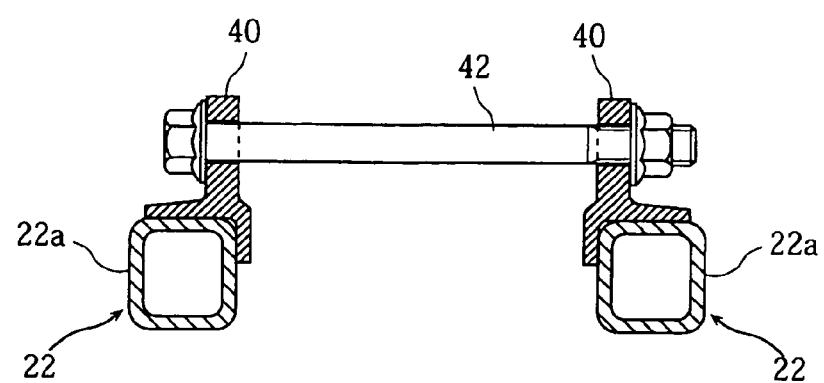
FIG. 11 is a sectional view of the down tube taken along the line XI-XI in FIG. 10.
Figure 12:
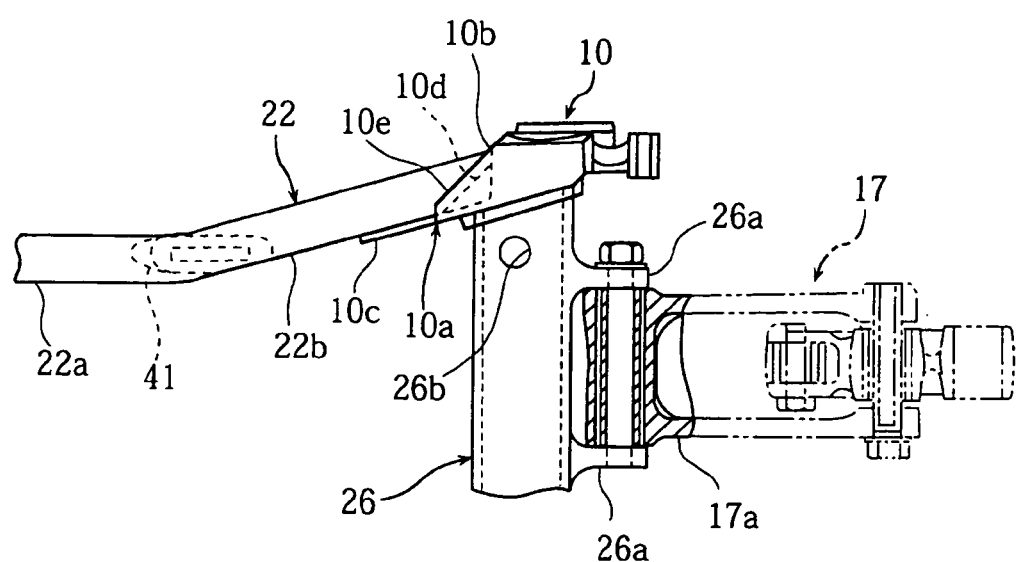
FIG. 12 is a bottom view of a linking part of a cross pipe with the rear arm bracket.
Figure 13:
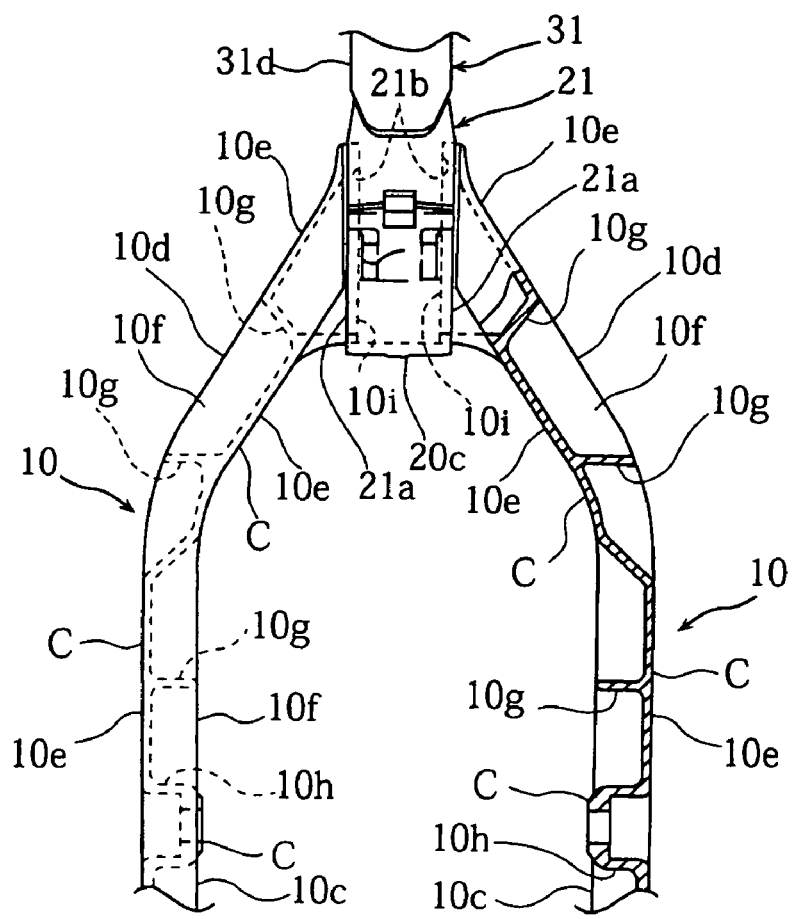
FIG. 13 is a rear view of the rear arm bracket.

FIGS. 1 through 13 are explanatory views of a body frame for a motorcycle according to an embodiment (first embodiment) of the present invention. FIG. 1 is a side view of a motorcycle on which a body frame of the embodiment of the present invention is mounted. FIGS. 2 and 3 are perspective views of a main frame. FIG. 4 is a right side view of the main frame. FIGS. 5 and 6 are perspective views of a head pipe unit. FIG. 7 is a perspective view of a joint of the rear arm brackets on their upper ends. FIG. 8 is a sectional front view of a head pipe. FIG. 9 is a sectional view of a gusset of the head pipe unit taken along the line IX-IX in FIG. 4. FIG. 10 is a front view of a connecting portion of the down tubes. FIG. 11 is a sectional view of the down tubes taken along the line XI-XI in FIG. 10. FIG. 12 is a bottom view of a connecting portion of a cross pipe. FIG. 13 is a rear view of the rear arm brackets. The terms, front and rear as well as right and left as used herein are meant as viewed from a rider seated on the motorcycle.

In FIG. 1, a reference numeral 1 denotes a motocross motorcycle having a body frame 2, on which an engine unit 3 is mounted, including a main frame 2a for supporting a front fork 4 and rear arms 5, as well as a seat rail 2b and a seat pillar 2c for supporting a seat 6.

The front fork 4 is pivotally supported by a head pipe 7 attached to the front end of the main frame 2a, allowing the front fork to be steered to the left or the right. The front fork 4 has a front wheel 8 pivotally supported at its lower end while having steering handle bars 9 fixed at its upper end. The rear arms 5 are pivotally supported for up-down swinging by left and right rear arm rackets 10, attached to the rear end of the main frame 2a. A rear wheel 11 is pivotally supported at the rear ends of the rear arms 5.

A rear suspension is disposed between the rear arms 5 and the main frame 2a. The rear suspension allows the rear arms 5 and the lower rear end of the main frame 2a to be linked to each other via a linkage 17 (see FIG. 12) while allowing the linkage 17 and the upper rear end of the main frame 2a to be linked to each other via a cushion unit 12.

In a cradle formed with the main frame 2a, the horizontal engine unit 3 is mounted with its crankshaft 3a oriented in a vehicle width direction. The engine unit 3 has a drive sprocket 13 fixed to its output shaft 3b. The drive sprocket 13 is connected to a driven sprocket 15 of the rear wheel 11 via a chain 14. Above the engine unit 3 or on the top of the main frame 2a, a fuel tank 16 is mounted. The seat 6 is mounted at the rear of the fuel tank 16.

The main frame 2a includes a head pipe unit 21 including the head pipe 7, upper and lower gussets 20 extending obliquely downward while widening to the rear of the vehicle from the head pipe 7 (for example, as shown in FIG. 5, gussets 20 have a narrower width 20m adjacent head pipe 7 and a wider width 20n as gussets 20 extend rearwardly from head pipe 7), a pair of left and right down tubes 22 extending obliquely downward from the lower end of the lower gusset 20 towards the rear of the vehicle, left and right rear arm brackets 10 interposed between the rear ends of the respective down tubes 22 and the rear end of the upper gusset 20, and a cross pipe 26 for connecting the lower ends of the rear brackets 10 to each other.

The head pipe unit 21 is made up of cast products such as AC4CH-T6. The left and right down tubes 22 are made up of extrusions such as A7NO1-T6. The left and right rear arm brackets 10, the seat rail 2b and the seat pillar 2c are forged products such as A7NO1-T6.

The head pipe unit 21 is shaped like a hollow box having a pair of left and right vertical walls 21a with its front and rear end faces closed as well as its upper and lower end faces opened. The head pipe 7 includes an arcuate-shaped front end of the left and right vertical walls 21a. The upper and lower gussets 20 have the left and right vertical walls 21a extending obliquely downward in parallel with each other while widening to the rear of the vehicle from the head pipe 7. An angular cylindrical tension pipe (connecting portion) 20b is formed integrally with the upper and lower gussets 20 to connect their rear portions to each other.

This results in an approximately triangular hole 20a formed at the rear of the upper and lower gussets 20. The inner periphery of the hole 20a is closed by an inner periphery wall 20g.

A rear cushion bracket 20c formed integrally with the upper rear end of the upper gusset 20 extends obliquely upward. The upper end of the cushion unit 12 is pivotally supported with the rear cushion bracket 20c to which the front end of the seat rail 2b is connected.

A pair of upper and lower supporting pieces 20d protruding rearward are integrally formed with a rear wall 20f of the tension pipe 20b. An ignition coil 23 is attached between the supporting pieces 20d. An engine supporting portion 20e integrally formed with the undersurface of the rear cushion bracket 20c of the upper gusset 20 protrudes therefrom. The upper end of the engine unit 3 is supported via an engine bracket 24 fastened to the supporting portion 20e with bolts. A recess 7a is provided on the left side of the head pipe 7 to receive a head pipe of a wire cable 25 for the clutch, brake, throttle and the like.

Reinforcing members are provided for plural portions of the main frame 2a that require high strength against a shock load transmitted from the road surface. In other words, the head pipe unit 21 has a down frame member 30 at its lower edge as a first reinforcing member, and a tank rail member 31 at its upper edge as a second reinforcing member. The left and right rear arm brackets 10 are made up of the third reinforcing members. The down frame member 30, the tank rail member 31 and the rear arm brackets 10 are each made up of a cast product such as A7N01-T6.

As shown in FIG. 9, the down frame member 30 and the tank rail member 31 mainly have their respective connecting walls 30a, 31a which extend like a band respectively along the undersurface and the top surface of the head pipe unit 21, and left and right sidewalls 30b, 31b which obliquely extend from the opposite edges of the connecting walls 30a, 31a. Each space created by the connecting wall and the sidewalls is opened outward.

The down frame member 30 is formed into an U-shape in cross-section with the respective corners made by the connecting wall 30a, and the respective sidewalls 30b approximately perpendicular to each other. The down frame member includes a lower head 30c for covering the undersurface of the head pipe 7, and a down frame 30d extending from the lower head 30c along the undersurface of the gusset 20.

The down frame member 30 has the connecting wall 30a formed thicker towards the lower head 30c and thinner towards the lower end of the down frame 30d. The down frame member 30 includes the connecting wall 30a which, as shown in FIG. 9. closes the opening 21c on the undersurface 21b of lower gusset 20 of the head pipe unit 21, and the left and right sidewalls 30b attached to the outer side of the vertical walls 21a. The left and right sidewalls 30b have the edges 30b' rigidly jointed to the vertical walls 21a via build-up welds 32a.

Figure 20:
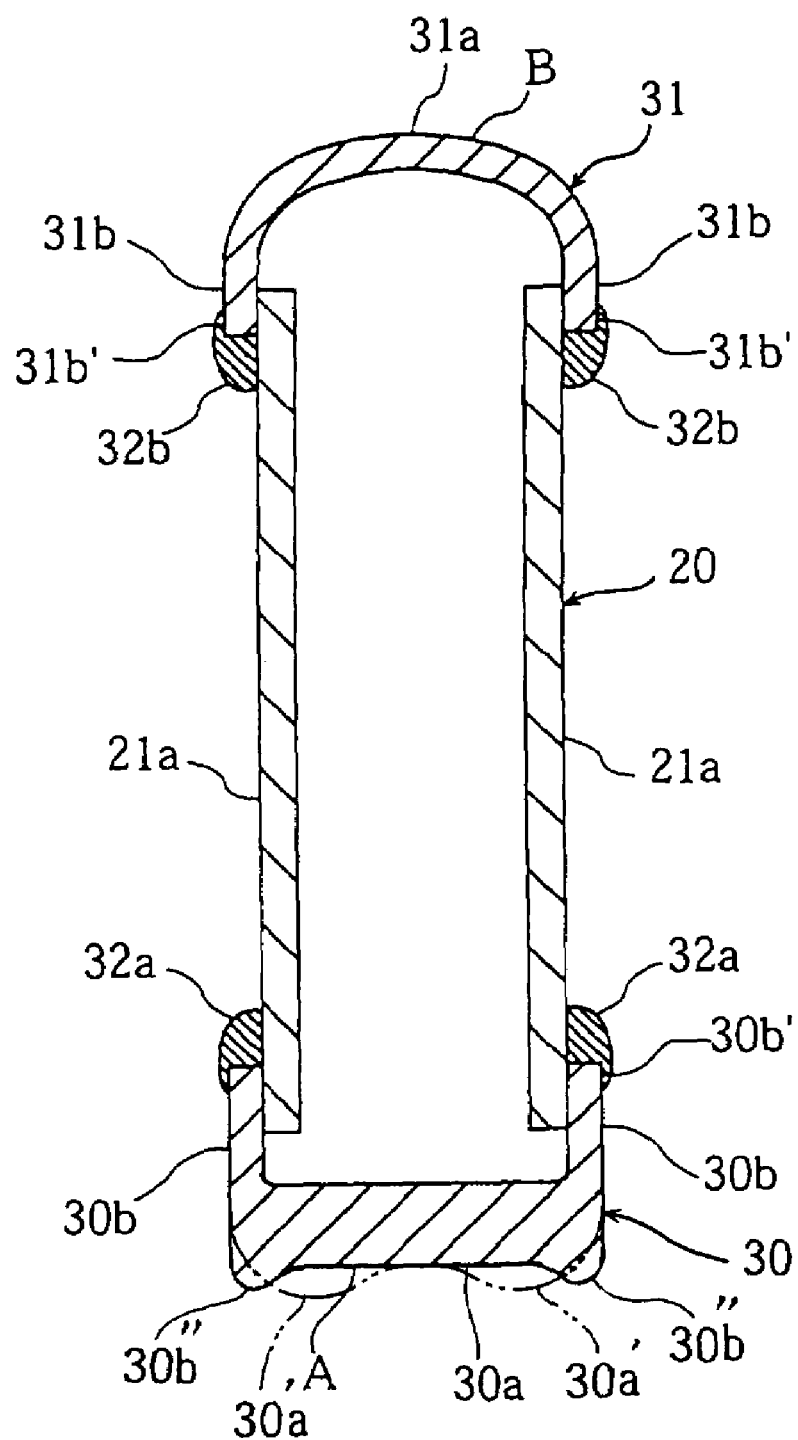
FIG. 20 is a sectional view showing an example of a variation of the head pipe unit.

The U-shaped down frame member has small circular corners on each side to avoid stress concentration. The down frame 30d may adopt various shapes for its end. They include, for example as shown in FIG. 20, a slightly-protruding base end 30b'' of the sidewall 30b from the connecting wall 30a, and as shown by the dashed lines in FIG. 20, the arc-shaped projection 30a' on the outer side of the connecting wall 30a.

The tank rail member 31 is generally formed into a C-shape in cross-section by connecting the connecting wall 31a with the left and right sidewalls 31b. The tank rail member includes an upper head 31c for covering the top surface of the head pipe 7, and tank rail 31d extending from the upper head 31c along the top surface of the upper gusset 20. The fuel tank 16 is mounted across the tank rail 31d. The fuel tank 16 has a tunnel-like recess (not shown) at its bottom through which the tank rail 31d can be inserted. The C-shaped tank rail 31d allows an increase in fuel capacity of the fuel tank 16.

The tank rail member 31 has the connecting wall 31a formed thicker towards the upper head 31c and thinner towards the rear end of the tank rail 31d. The tank rail member 31 includes the connecting wall 31a which, as shown in FIG. 9, closes the opening 21e on the top surface 21d of upper gusset 20 of the head pipe unit 21, and the left and right sidewalls 31b attached to the outer side of the vertical walls 21a. The left and right sidewalls 31b have the lower edges 31b' rigidly jointed to the vertical walls 21a via build-up welds 32b. The head pipe unit 21 has its upper and lower openings closed by the tank rail member 31 and the down frame member 30, respectively, while being supported by the members 31, 30.

The down frame member may adopt the same shape in cross-section as that designed for the tank rail member, while the tank rail member may adopt the same shape in cross-section as that designed for the down frame member.

The upper and lower heads 31a, 30a, as shown in FIG. 8, are provided with a steering shaft through holes 31e, 30e, respectively, in which bearing seats 31f, 30f each having a diameter larger than those of the through holes 31e, 30e are formed in a stepped manner. Bearings 34, 33 are attached to their respective bearing seats 31f, 30f. A steering shaft 35 inserted into the head pipe 7 is supported by the bearings 34, 33.

The left and right front forks 4 are fixed to the steering shaft 3 via upper and lower brackets 37, 36. The steering handlebars 9 are fixed to the upper bracket 37 via handlebar crowns 37a, 37a.

The down frame member 30 is provided such that the external face A of the connecting wall 30a is positioned in a portion of the head pipe unit 20 that requires high strength, that is, on the side where the highest stress occurs. In other words, the external face A is oriented to face outward (downward) when viewed in cross-section. The tank rail member 31 is in turn provided such that the external face B of the connecting wall 31a is positioned in a portion of the head pipe unit 20 that requires high strength, that is, on the side where the highest stress occurs. In other words, the external face B is oriented to face outward (upward).

The left and right angular cylindrical down tubes 22 have tilting portions 22a continued from the lower end of the down frame 30d of the down frame member 30, which obliquely extend downward separately to the left and right, and horizontal portions 22b extending rearward from the lower end of the tilting portions 22a approximately in the horizontal direction. The tilting portions 22a have a pair of left and right engine brackets 40. The horizontal portions 22b also have a pair of left and right engine brackets 41. These engine brackets are individually jointed to each corresponding portion by welding. The engine unit 3 has the front wall and connecting wall which are supported via supporting bolts 42 fastened across the left and right engine brackets 40, 41 (see FIG. 11).

The lower end of the down frame 30d is separated into two portions, left and right receiving portions 30g, which are formed integral therewith. As shown in FIG. 10, the receiving portions 30g have mounting openings 30h facing forward of the vehicle, which include a rear piece 30i, left and right inner pieces 30j, and left and right outer pieces 30k.

Left and right receiving portions 10a are formed at the lower ends of the left and right rear arm brackets 10. As shown in FIG. 12, each receiving portion 10a has a mounting opening 10b facing forward of the vehicle, which includes an inner piece 10c, and upper and lower pieces 10d, 10e. The left and right down tubes 22 have the horizontal portions 22b with their rear ends attached, from the front of the vehicle, to the receiving portions 10a of the rear arm brackets 10, as well as the tilting portions 22a with their front ends attached, from the front of the vehicle, to the receiving portions 30g of the down frame 30d. The rear and front ends are welded to the respective receiving portions 10a, 30g.

The lower ends of the left and right rear arm brackets 10 are welded to each other via the angular cylindrical cross pipe 26 made of an aluminum extrusion extending in the vehicle's width direction. A pair of left and right bosses 26a protruding rearward of the vehicle are formed integrally with the rear wall of the cross pipe 26. The link arms 17a of the linkage 17 are rotatably supported by the left and right bosses 26a (see FIG. 12).

A work hole 26b is formed through a portion to receive a fastening bolt (not shown) for change pedals on the cross pipe 26. Inserting a fastening tool (not shown) into the work hole 26b from below the vehicle to loosen the fastening bolt allows angle adjustments to mount the change pedals (not shown).

Each of the left and right rear arm brackets 10 is made up of the third reinforcing member, which is a cast product. The rear arm brackets include, as a unit, lower half portions 10c extending approximately vertically upward from the left and right down tubes 22, when viewed in the longitudinal direction of the vehicle, and upper half portions 10d extending obliquely inward in the vehicle's width direction from the upper ends of the lower half portions 10c.

The left and rear arm brackets 10 are individually formed into an approximately U-shape in cross-section, each including the connecting wall 10e extending in the vertical direction generally like a band, and the front and rear sidewalls 10f obliquely extending from the front and rear edges of the connecting wall 10e, respectively. Plural ribs 10g are integrally formed at predetermined intervals in the longitudinal direction between the connecting wall 10e and each of the sidewalls 10f.

The middle of the lower half portion 10c in the vertical direction is provided with a cylindrical recess 10h protruding inward of the vehicle from the connecting wall 10e. A pivot shaft 45 fastened between the left and right recesses 10h allows the rear arms 5 to swing up and down.

The connecting wall 10e is provided on the outer side of each upper half portion 10d at its upper end where a ring flange 10i is provided. The vertical walls 21a of the upper gusset 20 is provided with a recess 21b into which the flange 10i is attached. The outer periphery of the flange 10i is welded to the vertical wall 21a. Thus, a connecting portion of the rear arm brackets 10, that is, the upper ends of the rear arm brackets 10 with the upper gusset 20 has a closed cross-section.

Each of the left and right rear arm brackets 10 has the connecting wall 10e with its external face C facing the inner side of the vehicle on its upper half portion 10d, and the connecting fall 10e with its external face C facing the outer side of the vehicle on its lower half portion 10c. The flanges 10i are provided such that the connecting wall has the external face C facing the outer side of the vehicle. This allows the curved portion of each upper half portion 10d to have the connecting wall with its external face C positioned in a portion of the rear arm bracket 10 that requires high strength, that is, on the side where the highest stress occurs. Each of the recesses 10h has the connecting wall with its external face C facing the inner side of the vehicle.

A description will next be made of the functions and effects of the embodiment of the present invention.

In the body frame of the embodiment of the present invention, the head pipe unit 21 includes the down frame member 30, which is a forged product formed into a U-shape in cross-section, jointed to the lower edge of the lower gusset 20, and the tank rail member 31, which is also a forged product formed into a C-shape in cross-section, jointed to the upper edge of the upper gusset 20, in a portion that requires high strength. Each of the members 30, 31 has the connecting wall with its external face A or B facing outward in a portion of the head pipe unit 21 that requires high strength, that is, on the side where the highest stress occurs. This allows a shock load transmitted from the road surface to be received by the down frame member 30 and the tank rail member 31, so that the head pipe unit 21 can ensure rigidity and strength for its portion that requires high strength.

This accordingly allows the upper and lower gussets 20 to have openings on its top surface and undersurface, resulting in a weight reduction of the head pipe unit 21 and facilitated forging process thereof.

More specifically, the down frame member 30 includes the lower head 30c jointed to the undersurface of the head pipe 7, and the down frame 30d extending from the lower head 30c along the lower edge of the lower gusset 20. This therefore ensures rigidity and strength against a shock load acting on the lower-face connecting portion of the head pipe 7 to the lower gusset 20. In other words, the motorcycle jumps down from high places to the road surface, which causes the front and rear wheels 8, 11 to rebound. This results in a high tensile load applied adjacent to the connecting portion of the head pipe 7 to the lower gusset 20, which may be received by the high-strength down frame member 30.

The down frame member 30 is formed into a U-shape in cross-section, allowing an increase in cross-section of the connecting wall 30a, and accordingly an increase in section module as well as a decrease in tensile stress.

The lower head 30c is provided with bearing seats 30f so that the high-strength down frame member 30 can support a front fork 4, thereby enhancing rigidity and strength for supporting the front fork 4.

The tank rail member 31 includes the upper head 31c jointed to the top surface of the head pipe 7, and the tank rail 30d extending from the upper head 31c along the upper edge of the upper gusset 20. This can ensure rigidity and strength for a load applied to the upper-face connecting portion of the head pipe 7 to the upper gusset 20. In other words, as described above, the motorcycle jumps down, which causes the front and rear wheels 8, 11 to rebound. This results in a compression load acting on the upper-face connecting portion of the head pipe 7 to the upper gusset 20, which may be received by the tank rail member 31. The head pipe unit 21 is interposed between the down frame member 30 and the tank rail member 31, thereby enhancing rigidity and strength of the entire head pipe unit 21.

The down frame member 30 and the tank rail member 31 are disposed such that the connecting walls have the external faces A, B facing the outer side of the vehicle, while the sidewalls 30b, 31b are attached to the outer side of the vertical walls 21a. The sidewalls 30b, 31b have edges 30b' 31b' jointed to the vertical walls 21a via build-up welds. This can ensure welding strength of the down frame member 30 and the tank rail member 31 to the head pipe unit 21. The welded portions of the down frame member 30 and the tank rail member 31 are apart from the external faces A, B of the connecting walls. This can prevent the highest stress from acting on the welded portions.

In the embodiment of the present invention, the upper and lower gussets 20 have the angular cylindrical tension pipe 20b formed at their rear ends, the rear cushion bracket 20c extending obliquely upwards towards the rear, a pair of supporting pieces 20d, and the engine supporting portion 20e, all formed integrally as a unit. This can reduce the frame weight as well as the number of components and the cost.

In the embodiment of the present invention, the left and right rear arm brackets 10 are made up of the third reinforcing members, which are forged products. Also each of the rear arm brackets 10 has the connecting wall with its external face C provided on the side where the highest stress occurs. This can ensure rigidity and strength against a shock load transmitted from the road surface. In other words, the recesses 10h for pivotably supporting the rear arms 5 have each connecting walls with its external face C facing the inner side of the vehicle. This therefore ensures rigidity and strength against a shock load applied from the rear wheel 11 via the rear arms 5. The plural ribs 10g are integrally formed at predetermined intervals between the connecting wall 10e, and the front and rear sidewalls 10f, enhancing rigidity and strength of the rear arm brackets.

In the embodiment of the present invention, the left and right rear arm brackets 10 have the upper half portions 10d obliquely extending inward to the center or the upper gusset 20 from the left and right down tubes 22 provided with a sufficient interval there between. Also, the upper gusset 20 has the rear cushion 12 connected to its rear end. A high shock load from the motorcycle jumping down to the road surface from high places is applied to the obliquely-extending upper half portion 10d in the direction that it is pulled up. Accordingly, a high tensile load acts on the upper half portion 10d on its inner side of the vehicle. In the embodiment of the present invention, the connecting wall 10e has the external surface C facing the inner side of the vehicle so that the high tensile load may be received.

Each lower half portion 10c has the connecting wall with its external face C facing the outer side of the vehicle. This allows a rider to avoid discomfort when holding the lower half portions 10c between his/her legs.

The lower ends of the left and right rear arm brackets 10 are connected to each other via the angular cylindrical cross pipe 26 made of an aluminum extrusion. The work hole 26b is formed through a portion to receive the fastening bolt for the change pedals on the cross pipe 26. This ensures a required strength of the cross pipe 26 while reducing the weight thereof. Furthermore, this can facilitate the adjustments in angle to mount the change pedals.

In the embodiment of the present invention, the head pipe unit 21 includes the down frame member 30, as the first reinforcing member, jointed along its undersurface, the tank rail member 31, as the second reinforcing member, jointed along its top surface and the rear arm brackets 10 as the third reinforcing member. Therefore, a portion of the main frame 2a that requires the highest strength is generally enclosed by the three types of reinforcing members, which reduces the frame weight while further enhancing rigidity and strength of the entire main frame 2a.

In the embodiment of the present invention, the down frame member 30 has the receiving portions 30g divided in two with each provided with the mounting opening 30*h* facing forward of the vehicle. Each of the left and right rear arm brackets 10 has, at its lower end, the receiving portion 10*a* including the mounting opening 10*b* facing forward of the vehicle. Each down tube 22 has the horizontal portion 22*b* welded, from the front of the vehicle, to the receiving portion 10*a* of the rear arm bracket 10, as well as the tilting portion 22*a* welded, from the front of the vehicle, to the receiving portion 30*g* of the down frame 30*d*. This allows further accurate and easy assembly of the down tube 22, enhancing workability.

Figure 14:
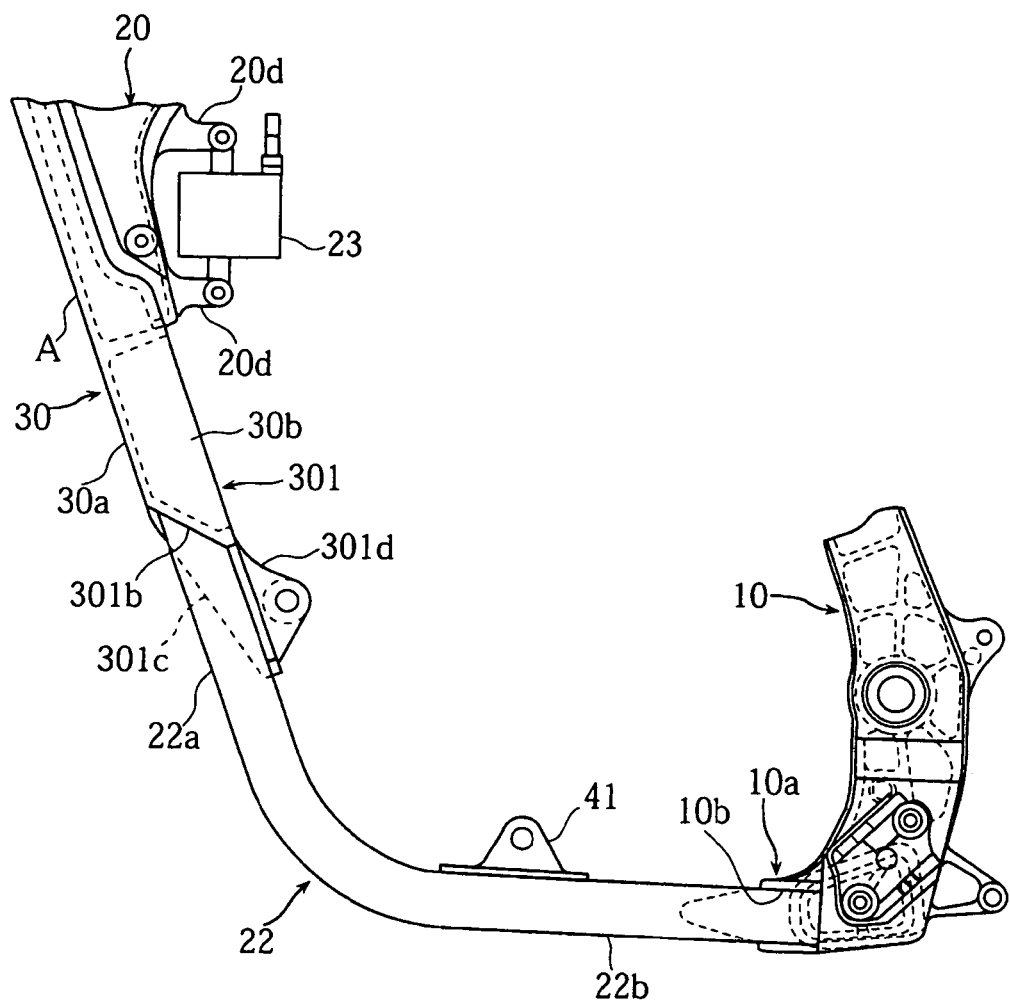
FIG. 14 is a side view of a main frame according to a second embodiment of the present invention.
Figure 15:
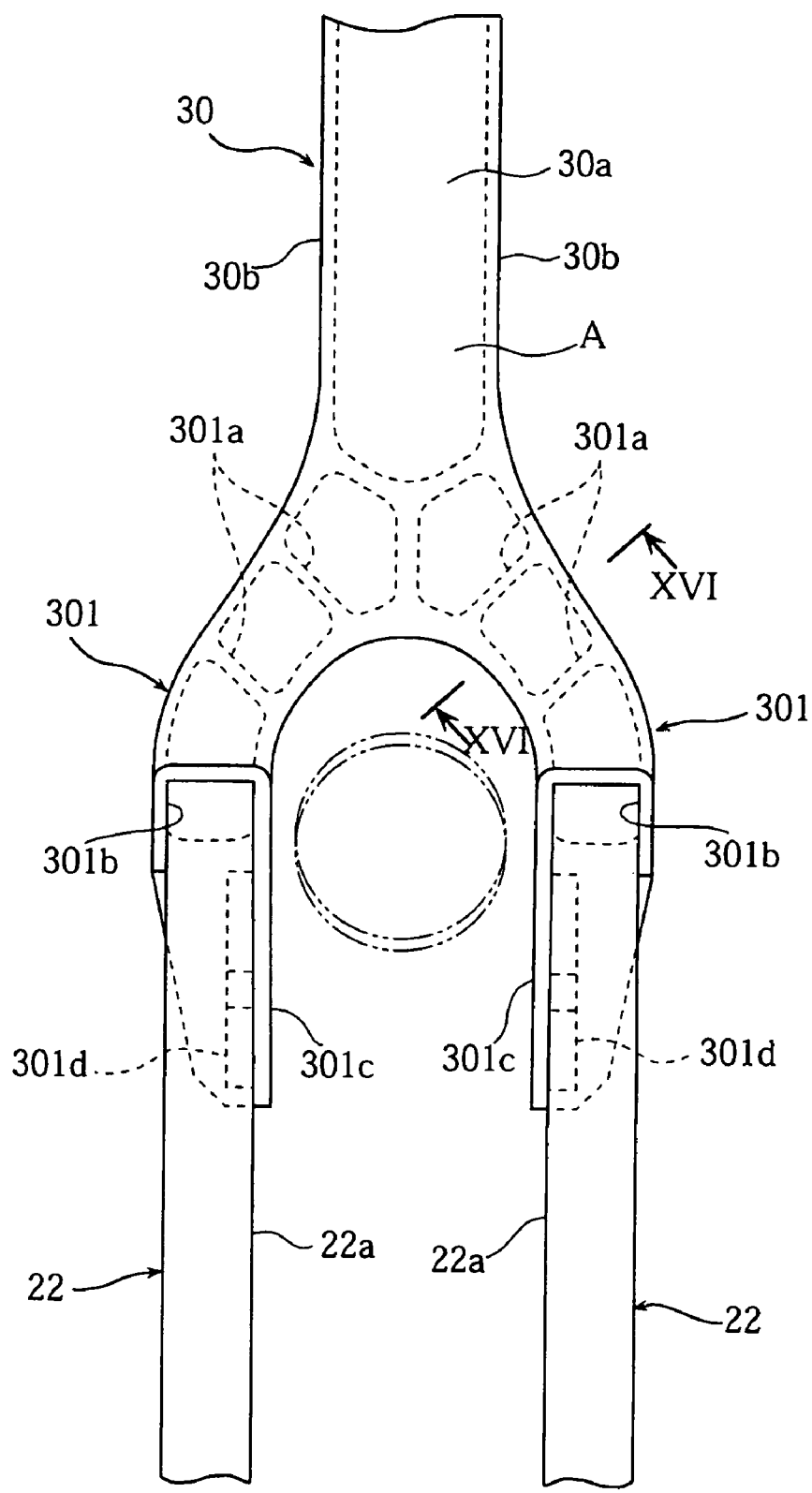
FIG. 15 is a front view of a connecting portion of a down tube of the main frame.
Figure 16:
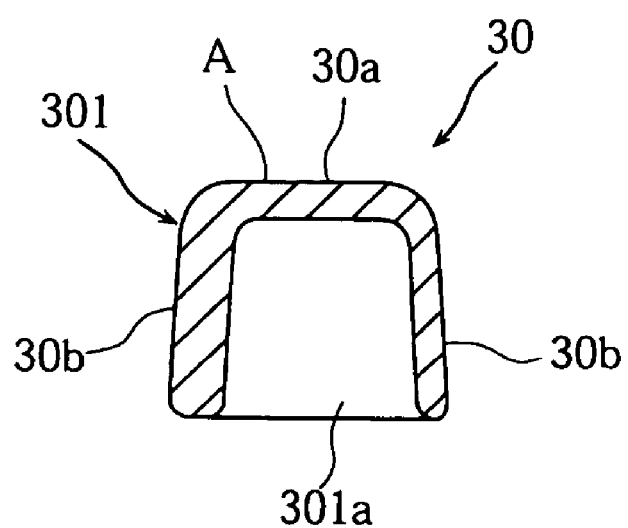
FIG. 16 is a sectional view of a first reinforcing member of the main frame taken along the line XVI-XVI in FIG. 15.

FIGS. 14 through 16 are explanatory views of a body frame according to a second embodiment of the present invention. In the drawings, the same reference numerals as those in FIGS. 2 and 10 show the same parts or equivalent parts.

In the second embodiment of the present invention, a down frame member 30 is separated from its lower end into left and right extending portions 301 formed integrally therewith and continuously extending toward the rear of the vehicle.

Each extending portion 301 has plural ribs 301*a* formed integrally between the connecting wall 30*a*, and the left and right sidewalls 30*b* while having, at its lower end, a receiving portion 301*c* including a mounting opening 301*b* facing forward of the vehicle. An engine bracket 301*d* is formed integrally with each extending portion 301.

Left and right down tubes 22 each have a straight tilting portion 22*a* welded to the receiving portion 301*c*.

In the second embodiment of the present invention, the down frame member 30 is separated from its lower end into the left and right extending portions 301 formed integrally therewith and continuously extending toward the rear of the vehicle. Accordingly, this can further enhance the frame strength by the extending portions 301. The engine brackets 301*d* are formed integrally with the extending portions 301, reducing the number of components.

Figure 17:
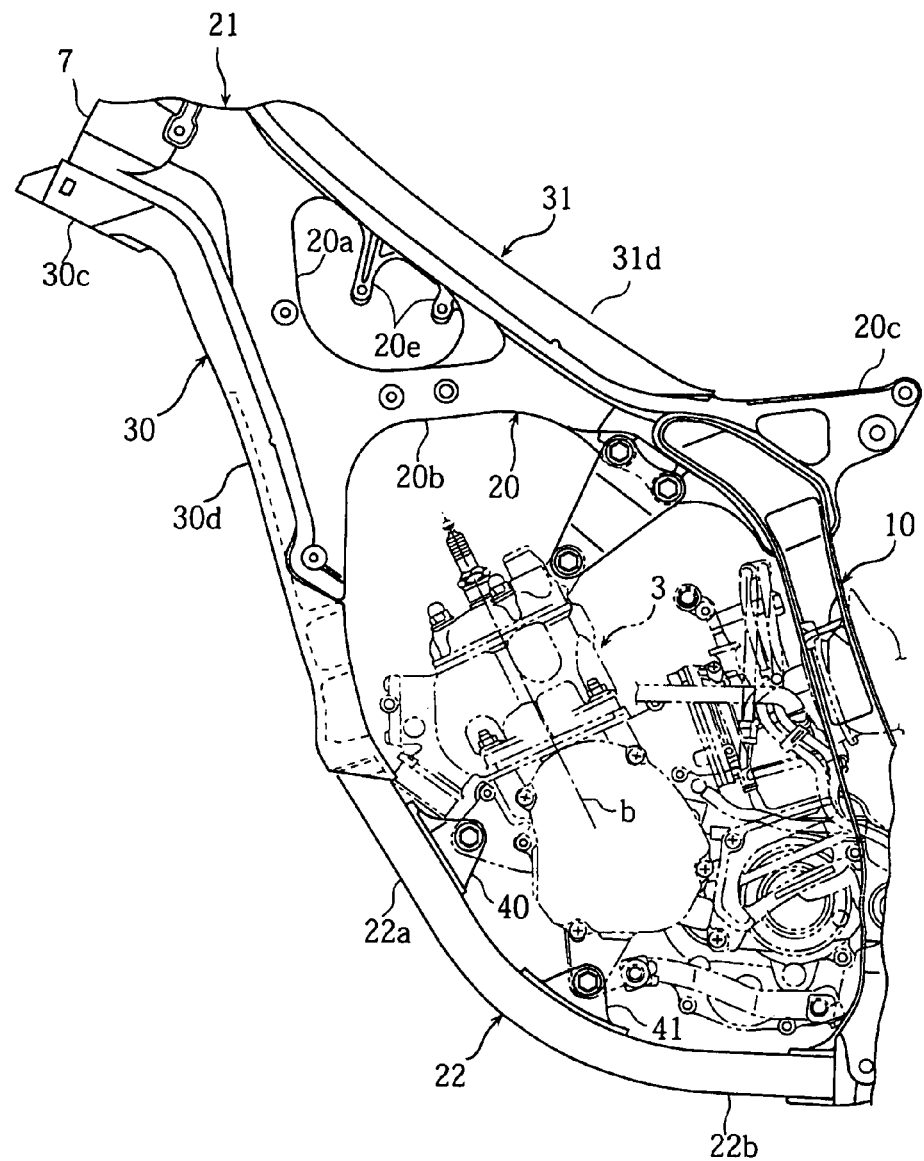
FIG. 17 is a side view of a main frame according to a third embodiment of the present invention.
Figure 18:
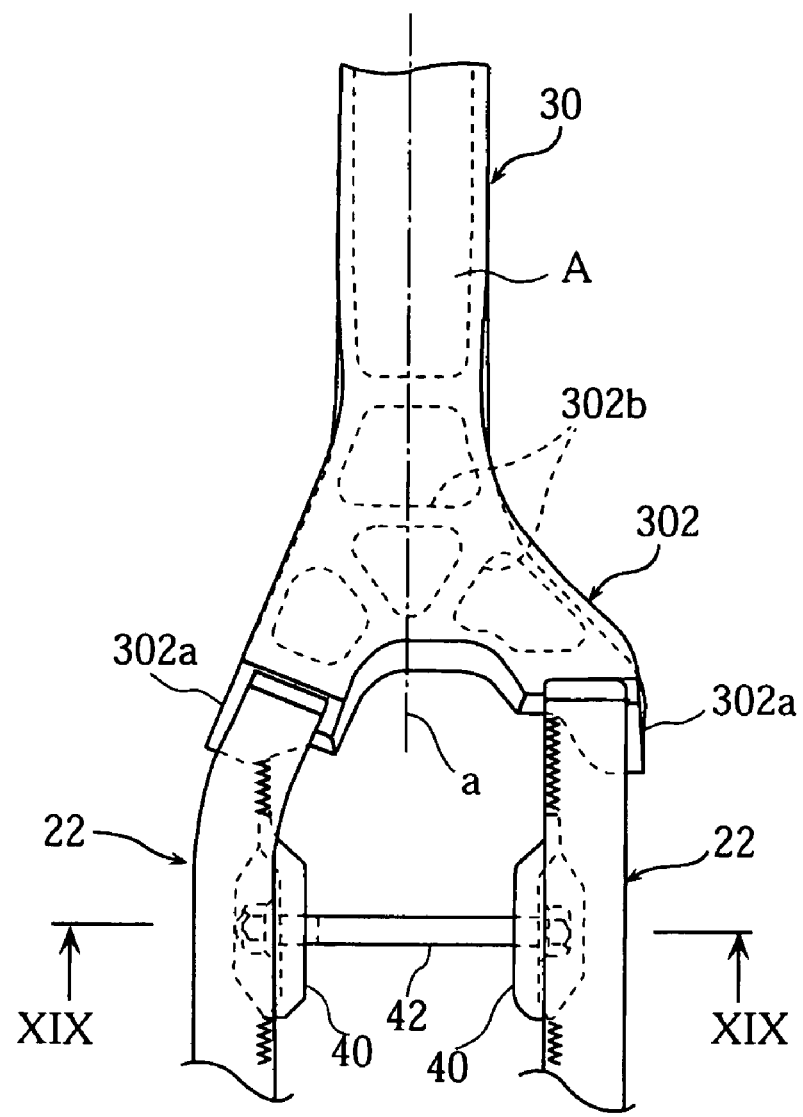
FIG. 18 is a front view of a connecting portion of a down tube of the main frame.
Figure 19:
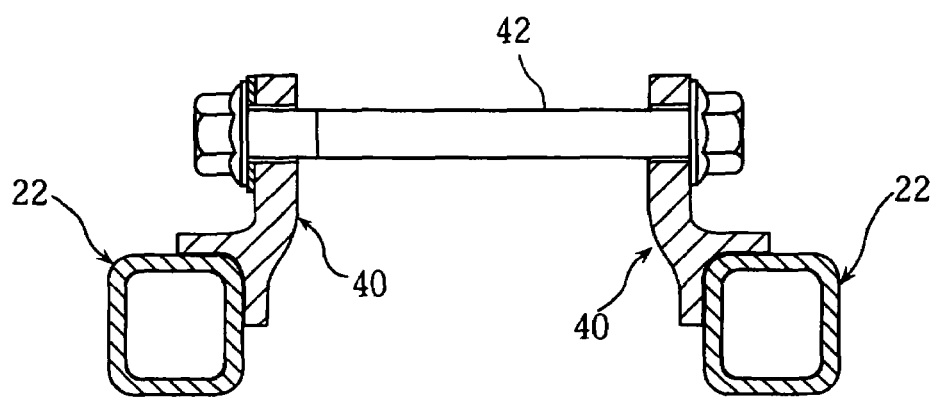
FIG. 19 is a sectional view of the down tube taken along the line XIX-XIX in FIG. 18.

FIGS. 17 through 19 are explanatory views of a body frame according to a third embodiment of the present invention. In the drawings, the same reference numerals as those in FIGS. 2 and 10 show the same parts or equivalent parts.

The third embodiment of the present invention illustrates that a down frame member 30 has an approximately sector-shaped reinforcing portion 302 formed integrally with its lower end, and the reinforcing portion 302 is provided with a pair of left and right receiving portions 302*a*. The center of the reinforcing portion 302 is displaced from the vehicle center line "a" towards one side in the vehicle's width direction. An engine unit 3 is mounted along a cylinder axis "b" tilting towards the front of the vehicle.

The reinforcing portion 302 has approximately triangular ribs 302*b* formed integrally with a connecting wall 30*a*, and left and right sidewalls 30*b*. The tilting portions 22*a* of the down tubes 22 are welded to each receiving portion 302*a*. As shown in FIG. 18, the upper end of the left down tube 22 is bent inwards of the vehicle while the right down tube 22 is formed in a straight line. A gusset 20 has a supporting piece 20*d* for supporting engine auxiliaries formed integrally with the inside of the hole 20*a*.

In the third embodiment of the present invention, a first reinforcing member 30 has a sector-shaped reinforcing portion 302 formed integrally with its lower end. Accordingly, this can further enhance the frame strength by the reinforcing portion 302.

According to an embodiment of the present invention, a body frame for a motorcycle is provided, in which the main frame has a reinforcing member, which is a forged product formed in a C-shape in cross section and a U-shape in cross-section, provided in its portion that requires high strength such that the reinforcing member has the connecting wall with its external face positioned in the portion that requires high strength, that is, on the side where highest stress occurs in cross-section. This allows a shock load transmitted from the road surface to be received by the connecting wall of the reinforcing member, thereby ensuring rigidity and strength for the portion of the main frame that requires high strength. Therefore, the other portion that does not require high strength does not have to be unnecessarily thick, resulting in a reduced frame weight.

The reinforcing member is a down frame member jointed to the undersurface of the head pipe and extending along the undersurface of the lower gusset to be jointed to the lower gusset, which has the connecting wall facing downward. This therefore ensures rigidity and strength against a high shock load applied adjacent to the lower-face connecting portion of the head pipe to the lower gusset. In other words, the motorcycle jumps down from high places to the road surface, which causes the front and rear wheels to rebound. This results in a high tensile load acting on the lower-face connecting portion of the head pipe to the gusset, and accordingly, the highest tensile stress occurs on the undersurface of the connecting portion. However, in the present invention, the reinforcing member has the connecting wall with its external face positioned on the side where the highest stress occurs. This allows the high tensile load to be received by the high-strength reinforcing member.

The lower head is provided with bearing seats so that the high-strength reinforcing member can support the front fork, thereby enhancing rigidity and strength for a portion that requires high strength.

The head pipe unit is made up of casting products, thereby ensuring required strength while reducing the weight of the head pipe unit as well as improving flexibility in unit form and size.

The reinforcing member is a tank rail member jointed to the top surface of the head pipe and extending along the top surface of the upper gusset to be jointed to the upper gusset, which has the connecting wall facing upward. This therefore ensures rigidity and strength against a high shock load applied adjacent to the upper-face connecting portion of the head pipe to the upper gusset. In other words, the motorcycle jumps down from a high places to the road surface, which causes the front and rear wheels to rebound. This results in a high compression load acting on the upper-face connecting portion of the head pipe to the gusset, and accordingly the highest compression stress occurs on the top surface of the connecting portion. However, in the present invention, the reinforcing member has the connecting wall with its external face positioned on the side where the highest stress occurs. This allows the high compression load to be received by the high-strength reinforcing member.

According to an embodiment of the present invention, the down frame member and the tank rail member are jointed to the lower gusset and the upper gusset of the head pipe unit, respectively, and the head pipe unit is interposed between the reinforcing members on its undersurface and top surface. This further enhances the rigidity and strength of the entire head pipe unit.

An opening of the head pipe unit on the lower gusset is closed by welding the down frame member as the reinforcing member thereto. Also, an opening on the upper gusset is closed by welding the tank rail thereto. Accordingly, this can further reduce the weight of the head pipe unit by the openings and ensure required strength. The reinforcing member to be welded is so disposed as to have the connecting wall with its external face facing outwardly and each sidewall with its edges positioned at the opening edges of the upper and lower gussets and welded to the wall of the gusset. This allows the welded line to be positioned apart from the external face of the connecting wall of the reinforcing member or the side where the highest stress occurs, thereby preventing the highest stress from acting on the welded portion.

The connecting portion and the rear cushion bracket are formed integrally with the head pipe unit. This can reduce the number of components and the cost.

The left and rear arm brackets are made up of reinforcing members and each of the reinforcing members has the connecting wall with its external face positioned on the side where the highest stress occurs. This can ensure rigidity and strength against a high load applied to the rear arm brackets. In other words, a high load acting on the rear cushion results in a high tensile load applied to the upper portion of the rear arm bracket for which the external face of the connecting wall of the rear arm bracket, which is made up of the reinforcing member, is provided in the present invention so that the required rigidity and strength can be ensured.

The rear arm bracket has the connecting wall with its external face facing the inner side of the vehicle on its upper half portion and facing the outer side of the vehicle on its lower half portion. This can ensure the required rigidity and strength on the upper half portion while ensuring the rider's comfort when holding the lower half portions between his/her legs.

In other words, in the present invention, the rear arm bracket has the upper half portion obliquely extending inwards to the center or the tank rail from each of the left and right down frames provided with an interval in the vehicle width direction. A high load acting on the rear end of the tank rail via the cushion unit results in a load applied to the obliquely-extending upper half portion in the direction that it is pulled in straight. Accordingly, high tensile stress occurs on the inner side of the rear arm bracket, which may be withstood by the external face of the connecting wall provided thereon in the present invention.

A rider holds the lower half portions between his/her legs to maintain the driving posture. In the present invention, each of the lower half portions has the connecting wall with its external face facing outward, which allows preventing the rider's discomfort.

A connecting portion of the rear arm brackets to the tank rail is provided with the connecting wall having the external face facing outward. This results in a box-shaped closed cross-section formed in the connecting portion of the rear arm brackets to the tank rail, thereby enhancing rigidity and strength thereof.

Also, the lower ends of the left and right rear arm brackets are connected to each other via a cross pipe made of an extrusion. A work hole is formed through a portion to receive the fastening bolt for the change pedals on the cross pipe. This ensures the required strength of the cross pipe while reducing the weight thereof. Furthermore, this can facilitate the adjustments in the angle to mount the change pedals.

The reinforcing members including the down frame member and the tank rail member are welded along the undersurface and the top surface of the head pipe unit, respectively, and the down tubes and the tank rail member are jointed via the additional reinforcing members or the rear arm brackets. The three types of reinforcing members can generally enclose a portion of the main frame that requires the highest strength, thereby reducing the frame weight and enhancing the rigidity and strength of the entire main frame.

Further, the down frame member has a receiving portion provided with a mounting opening facing forward of the vehicle. Each of the left and right rear arm brackets has a receiving portion provided with a mounting opening facing forward. Each of the down tubes has its rear end attached to the receiving portion of the rear arm bracket from the front of the vehicle, and its front end attached to the receiving portion of the down frame from the front of the vehicle. The ends are welded to the respective receiving portions. This allows more accurate and easier assembly of the down tubes, thereby enhancing workability.

What is claimed is:

1. A body frame for a motorcycle comprising:
   a down frame member having sidewalls and a single connecting wall that connects the sidewalls to define a space opened upward in cross-section, wherein an external face of the connecting wall faces downward;
   a tank rail member having a C-shape in cross-section; and
   gussets defining vertical walls that connect the sidewalls of the down frame member with the tank rail member.

2. The body frame of claim 1, further comprising a head pipe for supporting a front fork, wherein:
   the gussets extend obliquely downward from the head pipe while widening in a rearward manner.

3. The body frame of claim 2, wherein:
   the down frame member comprises a lower head connected to a lower end of the head pipe and having a bearing seat, and
   the down frame member extends from the lower head and the sidewalls of the down frame member cover and are jointed to lower edges of the vertical walls of the gussets from below.

4. The body frame of claim 2, wherein:
   the tank rail member has sidewalls and a single connecting wall that connects the sidewalls to define a space opened downward in cross-section, wherein an external face of the connecting wall faces upward,
   the tank rail member further comprises an upper head connected to an upper end of the head pipe and having a bearing seat, and
   the tank rail member extends from the upper head and the sidewalls of the tank rail member cover and are jointed to upper edges of the vertical walls of the gussets from above.

5. The body frame of claim 1, and further comprising:
   rear cushion brackets formed integrally with and extending from rear portions of the gussets.

6. The body frame of claim 2, wherein:
   the tank rail member extends obliquely downward and rearward from a top portion of the head pipe;
   the down frame member extends obliquely downward and rearward from a bottom portion of the head pipe;
   a pair of left and right down tubes extend rearward from a rear end of the down frame member; and
   a pair of left and right rear arm brackets connect rear ends of the down tubes and a rear end of the tank rail member, and support rear arms in a manner to permit the rear arms to move in an up and down swinging motion.

7. The body frame of claim 6, wherein each rear arm bracket has an approximately U-shaped cross-section comprising front and rear sidewalls extending from front and rear edges of a vertically extending connecting wall.

8. The body frame of claim 7, wherein inwardly facing external faces are defined on upper portions of the connecting walls of the rear arm brackets adjacent the connections with the tank rail member.

9. The body frame of claim 8, wherein outwardly facing external faces are formed on lower portions of the connecting walls of the rear arm brackets adjacent the connections with the down tubes.

10. The body frame of claim 6, wherein lower portions of the rear arm brackets are connected by an extruded angular cylindrical cross pipe, and wherein a work hole is formed through the cross pipe to receive a fastening bolt for change pedals.

11. The body frame of claim 6, wherein:
a rear end of the down frame member has receiving portions formed with rearward-facing mounting openings;
lower ends of the rear arm brackets have receiving portions formed with forward-facing mounting openings;
front ends of the down tubes are received in and welded to the receiving portions of the rear end of the down frame member; and
rear ends of the down tubes are received in and welded to the receiving portions of the lower ends of the rear arm brackets.

12. A motorcycle comprising the body frame of claim 1.

13. A body frame for a motorcycle comprising:
a head pipe;
a first reinforcing member extending rearward from a lower end of the head pipe and comprising sidewalls connected by a single connecting wall to define a space opened upward in cross-section, an external face of the connecting wall facing downward;
a second reinforcing member extending rearward from an upper end of the head pipe and comprising sidewalls connected by a single connecting wall to define a space opened downward in cross-section, an external face of the connecting wall facing upward; and
gussets comprising vertical walls connecting the sidewalls of the first reinforcing member with the sidewalls of the second reinforcing member, wherein the sidewalls of the first reinforcing member are welded to and cover lower edges of the vertical walls of the gussets, and the sidewalls of the second reinforcing member are welded to and cover upper edges of the vertical walls of the gussets.

14. The body frame of claim 13, wherein:
the first reinforcing member is a down frame member having a U-shaped cross-section; and
the second reinforcing member is a tank rail member having a C-shaped cross-section.

15. The body frame of claim 13, and further comprising:
a pair of down tubes extending rearward from a rear end of the first reinforcing member; and
third reinforcing members connecting rear ends of the down tubes and a rear end of the second reinforcing member, and being configured to support rear arms that move in an up and down swinging motion.

16. The body frame of claim 15, wherein each third reinforcing member has an approximately U-shaped cross-section comprising front and rear sidewalls extending from front and rear edges of a vertically extending connecting wall.

17. The body frame of claim 16, wherein:
inwardly facing external faces are defined on upper portions of the connecting walls of the third reinforcing members adjacent the second reinforcing member; and
outwardly facing external faces are formed on lower portions of the connecting walls of the third reinforcing members adjacent the down tubes.

18. A motorcycle comprising the body frame of claim 13.

* * * * *